US010779156B2

(12) United States Patent
Clark et al.

(10) Patent No.: US 10,779,156 B2
(45) Date of Patent: *Sep. 15, 2020

(54) SYSTEM AND METHODS FOR DATA COMMUNICATIONS IN A WIRELESS COMMUNICATION SYSTEM

(71) Applicant: BlackBerry Limited, Waterloo (CA)

(72) Inventors: David Clark, Kitchener (CA); Allan David Lewis, New Dundee (CA); Barry Gilhuly, Waterloo (CA); David Bajar, Kitchener (CA); Nataliya Martsyna, Waterloo (CA); Robbie John Maurice, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,367

(22) Filed: Nov. 15, 2018

(65) Prior Publication Data
US 2019/0104400 A1 Apr. 4, 2019

Related U.S. Application Data

(63) Continuation of application No. 15/716,011, filed on Sep. 26, 2017, now Pat. No. 10,136,299, which is a
(Continued)

(51) Int. Cl.
H04L 29/08 (2006.01)
H04L 12/58 (2006.01)
(Continued)

(52) U.S. Cl.
CPC ............... *H04W 8/06* (2013.01); *H04L 51/18* (2013.01); *H04L 67/04* (2013.01); *H04L 67/14* (2013.01);
(Continued)

(58) Field of Classification Search
CPC ......... H04W 8/06; H04W 4/12; H04W 88/02; H04L 51/18; H04L 67/303; H04L 67/14;
(Continued)

(56) References Cited

U.S. PATENT DOCUMENTS 5,280,521 A 1/1994 Itoh
5,978,678 A 11/1999 Houde et al.
(Continued)

OTHER PUBLICATIONS

Office Action dated Mar. 13, 2008; U.S. Appl. No. 11/303,428, filed Dec. 16, 2005; 7 pages. (4214-58901).
(Continued)

*Primary Examiner* — Joseph E Dean, Jr.
(74) *Attorney, Agent, or Firm* — Conley Rose, P.C.; J. Robert Brown, Jr.; Gayatry S. Nair

(57) ABSTRACT

Techniques for use by a mobile device configured to operate in a wireless network for the communication of data messages with a server are described. When the mobile device does not have an open session with the server, the mobile device receives from a service node via the wireless network a message which informs the mobile device that a data message has arrived at the server and needs to be retrieved. The message includes an identifier which identifies the data message at the server. In response to opening an application at the mobile device, the mobile device communicates directly with the server via the wireless network for retrieving the data message. This involves commencing an open session with the server, sending to the server a command for retrieving the data message, and receiving from the server the data message in response to sending the command. The mobile device may use the identifier for retrieving the data message from the server.

20 Claims, 3 Drawing Sheets

Related U.S. Application Data continuation of application No. 15/333,839, filed on Oct. 25, 2016, now Pat. No. 9,794,770, which is a continuation of application No. 14/213,025, filed on Mar. 14, 2014, now Pat. No. 9,549,311, which is a continuation of application No. 13/673,191, filed on Nov. 9, 2012, now Pat. No. 8,918,084, which is a continuation of application No. 13/302,224, filed on Nov. 22, 2011, now Pat. No. 8,320,900, which is a continuation of application No. 12/957,977, filed on Dec. 1, 2010, now Pat. No. 8,090,363, which is a continuation of application No. 12/622,849, filed on Nov. 20, 2009, now Pat. No. 7,848,751, which is a continuation of application No. 11/303,428, filed on Dec. 16, 2005, now Pat. No. 7,630,714.

(60) Provisional application No. 60/734,448, filed on Nov. 8, 2005.

(51) Int. Cl.
   *H04W 8/06* (2009.01)
   *H04W 4/12* (2009.01)
   *H04W 88/02* (2009.01)

(52) U.S. Cl.
   CPC ............ *H04L 67/142* (2013.01); *H04L 67/18* (2013.01); *H04L 67/303* (2013.01); *H04W 4/12* (2013.01); *H04L 51/38* (2013.01); *H04W 88/02* (2013.01)

(58) Field of Classification Search
   CPC ....... H04L 67/04; H04L 67/142; H04L 67/18; H04L 51/38
   See application file for complete search history.

(56) References Cited

U.S. PATENT DOCUMENTS

| | | | |
|---|---|---|---|
| 6,138,146 A | 10/2000 | Moon et al. | |
| 6,473,609 B1* | 10/2002 | Schwartz | G06F 3/0237 455/403 |
| 6,807,423 B1 | 10/2004 | Armstrong | |
| 7,120,455 B1 | 10/2006 | Chen et al. | |
| 7,366,529 B2 | 4/2008 | Alanara et al. | |
| 7,630,714 B2 | 12/2009 | Clark et al. | |
| 7,848,751 B2 | 12/2010 | Clark et al. | |
| 8,090,363 B2 | 1/2012 | Clark et al. | |
| 8,320,900 B2 | 11/2012 | Clark et al. | |
| 8,918,084 B2 | 12/2014 | Clark et al. | |
| 9,549,311 B2 | 1/2017 | Clark et al. | |
| 9,794,770 B2 | 10/2017 | Clark et al. | |
| 2002/0002591 A1 | 1/2002 | Ketola | |
| 2002/0160790 A1 | 10/2002 | Schwartz et al. | |
| 2003/0073440 A1 | 4/2003 | Mukherjee et al. | |
| 2004/0014456 A1 | 1/2004 | Vaananen | |
| 2004/0014473 A1 | 1/2004 | Ando | |
| 2004/0081178 A1* | 4/2004 | Fujimori | H04Q 3/0058 370/401 |
| 2004/0203761 A1 | 10/2004 | Baba et al. | |
| 2005/0038863 A1 | 2/2005 | Onyon et al. | |
| 2005/0233740 A1 | 10/2005 | Jiang | |
| 2005/0239442 A1* | 10/2005 | Chen | H04W 4/12 455/412.2 |
| 2006/0224681 A1 | 10/2006 | Wurster | |
| 2006/0252435 A1* | 11/2006 | Henderson | H04L 51/066 455/466 |
| 2007/0025340 A1* | 2/2007 | Bettis | H04M 3/493 370/352 |
| 2007/0042750 A1 | 2/2007 | O'Neil et al. | |
| 2008/0160997 A1 | 7/2008 | Kim | |
| 2009/0104922 A1 | 4/2009 | Dudley et al. | |
| 2018/0027403 A1 | 1/2018 | Clark et al. | |

OTHER PUBLICATIONS

Final Office Action dated Jul. 25, 2008; U.S. Appl. No. 11/303,428, filed Dec. 16, 2005; 12 pages. (4214-58901).
Office Action dated Nov. 6, 2008; U.S. Appl. No. 11/303,428, filed Dec. 16, 2005; 11 pages. (4214-58901).
Final Office Action dated Apr. 21, 2009; U.S. Appl. No. 11/303,428, filed Dec. 16, 2005; 12 pages. (4214-58901).
Advisory Action dated Jun. 18, 2009; U.S. Appl. No. 11/303,428, filed Dec. 16, 2005; 3 pages. (4214-58901).
Notice of Allowance dated Jul. 27, 2009; U.S. Appl. No. 11/303,428, filed Dec. 16, 2005; 4 pages. (4214-58901).
Office Action dated Feb. 22, 2010; U.S. Appl. No. 12/622,849, filed Nov. 20, 2009; 9 pages. (4214-58902).
Notice of Allowance dated Aug. 13, 2010; U.S. Appl. No. 12/622,849, filed Nov. 20, 2009; 4 pages. (4214-58902).
Office Action dated Mar. 8, 2011; U.S. Appl. No. 12/957,977, filed Dec. 1, 2010; 11 pages. (4214-58903).
Final Office Action dated Aug. 12, 2011; U.S. Appl. No. 12/957,977, filed Dec. 1, 2010; 14 pages. (4214-58903).
Notice of Allowance dated Nov. 15, 2011; U.S. Appl. No. 12/957,977, filed Dec. 1, 2010; 5 pages. (4214-58903).
Office Action dated Mar. 16, 2012; U.S. Appl. No. 13/302,224, filed Nov. 22, 2011; 12 pages. (4214-58904).
Notice of Allowance dated Jul. 25, 2012; U.S. Appl. No. 13/302,224, filed Nov. 22, 2011; 5 pages. (4214-58904).
Office Action dated Mar. 6, 2013; U.S. Appl. No. 13/673,191, filed Nov. 9, 2012; 6 pages. (4214-58905).
Notice of Allowance dated Jul. 17, 2013; U.S. Appl. No. 13/673,191, filed Nov. 9, 2012; 10 pages. (4214-58905).
Notice of Allowance dated Nov. 22, 2013; U.S. Appl. No. 13/673,191, filed Nov. 9, 2012; 7 pages. (4214-58905).
Notice of Allowance dated Aug. 19, 2014; U.S. Appl. No. 13/673,191, filed Nov. 9, 2012; 6 pages. (4214-58905).
Office Action dated Apr. 14, 2015; U.S. Appl. No. 14/213,025, filed Mar. 14, 2014; 12 pages. (4214-58906).
Final Office Action dated Oct. 22, 2015; U.S. Appl. No. 14/213,025, filed Mar. 14, 2014; 18 pages. (4214-58906).
Advisory Action dated Jan. 8, 2016; U.S. Appl. No. 14/213,025, filed Mar. 14, 2014; 3 pages. (4214-58906).
Office Action dated Feb. 11, 2016; U.S. Appl. No. 14/213,025, filed Mar. 14, 2014; 7 pages. (4214-58906).
Notice of Allowance dated Jun. 17, 2016; U.S. Appl. No. 14/213,025, filed Mar. 14, 2014; 7 pages. (4214-58906).
Office Action dated Dec. 2, 2016; U.S. Appl. No. 15/333,839, filed Oct. 25, 2016; 7 pages. (4214-58907).
Notice of Allowance dated Jun. 8, 2017; U.S. Appl. No. 15/333,839, filed Oct. 25, 2016; 16 pages. (4214-58907).
Office Action dated Jan. 2, 2018; U.S. Appl. No. 15/716,011, filed Sep. 26, 2017; 15 pages. (4214-58908).
Notice of Allowance dated Jul. 6, 2018; U.S. Appl. No. 15/716,011, filed Sep. 26, 2017; 8 pages. (4214-58908).

* cited by examiner

SYSTEM AND METHODS FOR DATA COMMUNICATIONS IN A WIRELESS COMMUNICATION SYSTEM

CROSS-REFERENCE TO RELATED APPLICATIONS

This application is a continuation of U.S. patent application Ser. No. 15/716,011 filed Sep. 26, 2017 by David Clark, et al. entitled, "System and Methods for Data Communications in a Wireless Communication System", which is a continuation of U.S. Pat. No. 9,794,770 issued on Oct. 17, 2017, which is a continuation of U.S. Pat. No. 9,549,311 issued on Jan. 17, 2017, which is a continuation of U.S. Pat. No. 8,918,084 issued on Dec. 23, 2014, which is a continuation U.S. Pat. No. 8,320,900 issued on Nov. 27, 2012, which is a continuation U.S. Pat. No. 8,090,363 issued on Jan. 3, 2012, which is a continuation of U.S. Pat. No. 7,848,751 issued on Dec. 7, 2010, which is a continuation of U.S. Pat. No. 7,630,714 issued on Dec. 8, 2009, which claims priority to and benefit of U.S. Provisional Application No. 60/734,448 filed Nov. 8, 2005 by David Clark, et al. entitled, "System and Methods for Data Communications in a Wireless Communication System", all of which are incorporated by reference herein as if reproduced in their entirety.

TECHNICAL FIELD

This invention relates to wireless communication techniques in general, and a system and methods for configuring data communications in a wireless communications system in particular.

BACKGROUND

User mobility has always been a hallmark of cellular phones and more recently data enabled mobile devices. The ability to travel with a mobile device wherever desired is increasingly becoming a must have feature for mobile device users. Manufacturers are not ignorant of these user demands and offer mobile devices which can be used throughout much of the world. Network carriers are also not ignorant of these market pressures and so they offer their users the ability to roam with their devices and maintain service, through roaming agreements with other network carriers. A user may take their mobile device from their home country or region and travel elsewhere and still receive service from a foreign network carrier.

It is not necessary for all network carriers to provide the same set of functionalities and services. A network carrier in one country may not have enough demand from their users to offer a service. A region's populace or customer base may not be willing to pay sufficient amounts of money to induce a network carrier into offering a feature. Alternatively, a country may not allow certain services based on religious ideals or because of legal requirements.

It is possible for a user of a mobile device to gain service from a foreign network carrier temporarily, while, for example, on a business trip. It is also possible for changes in a country's legal system or for a populace's tastes to change. As such, a mechanism is required to forcefully, easily and automatically alter the services and/or the features offered to and the behaviour of a mobile device, or devices, based on the location and abilities of the mobile device.

BRIEF DESCRIPTION OF THE DRAWINGS

A better understanding of the present invention will be obtained by considering the detailed description below, with reference to the following drawings.

DETAILED DESCRIPTION OF THE DRAWINGS

Figure 1:
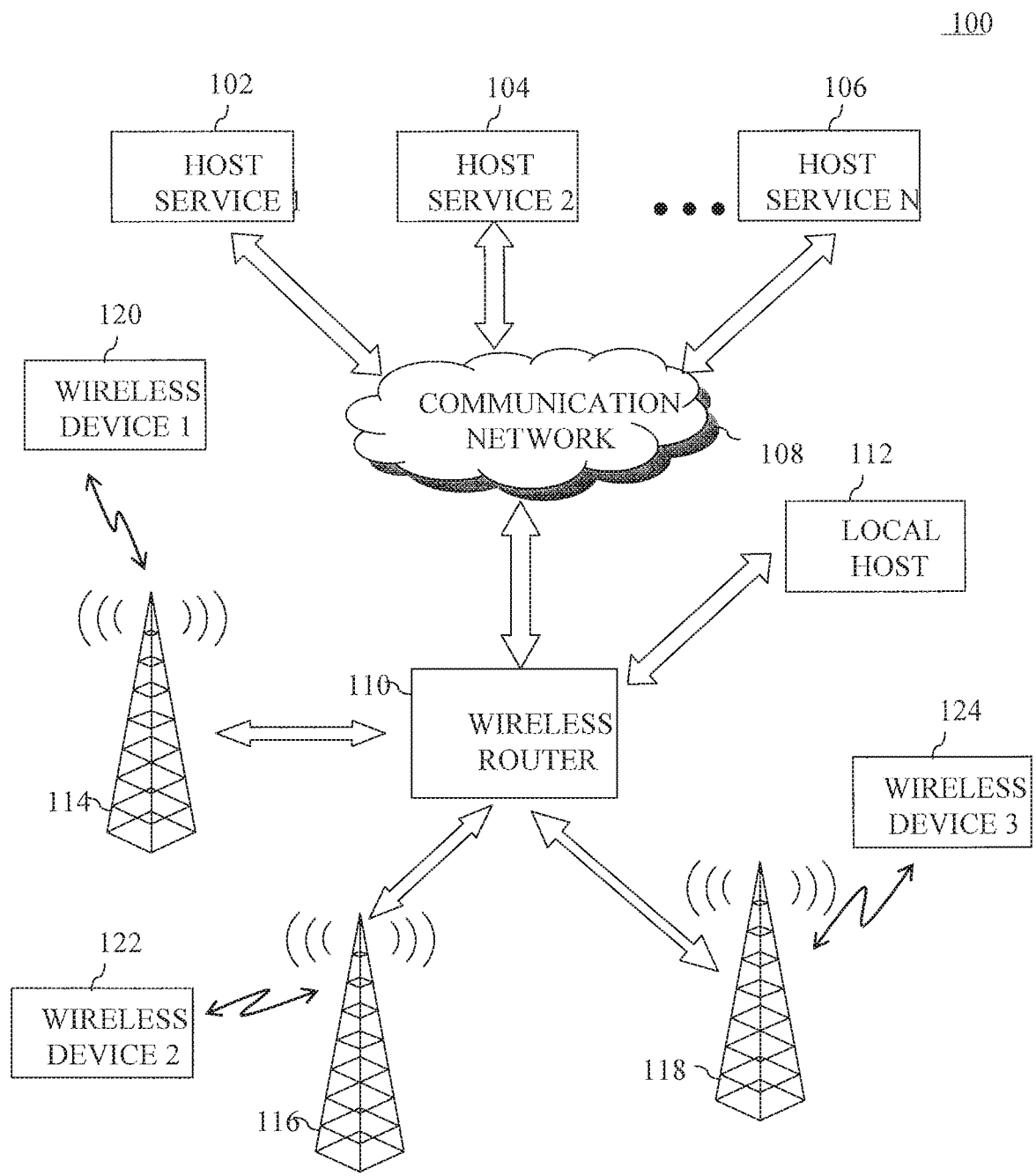
FIG. 1 is an exemplary environment in which a wireless communication system and method in accordance with a preferred embodiment may be practiced.

The present invention will now be described with reference to various examples of how the embodiments can best be made and used. Like reference numerals are used throughout the description and several views of the drawings to indicate like or corresponding parts, wherein the various elements are not necessarily drawn to scale.

In an embodiment is disclosed a method for enabling wireless data communications between a first and a second communications device, the method comprising providing location information and capability information associated with at least one of the first and second communications devices based on said provided location information and said provided capability information, providing a mask and selectively enabling wireless data communications based on said mask.

In another embodiment is disclosed a method for enabling wireless data communications at a communications device, the method comprising sending location information and capability information associated with the communications device to selectively enable wireless data communications subsequent to said sending of said location information and said capability information, sending a data message from the communications device in response to the data message sent, receiving an enablement response selectively sending a subsequent data message from the communications device based on said enablement response.

In yet another embodiment is disclosed a system for enabling wireless data communications between a first and a second communications device, the system comprising a communication module adapted to provide location information and capability information associated with at least one of the first and second communications devices and an enablement module adapted to provide a mask based on said provided location information and said provided capability information wherein the enablement module is further adapted to selectively enable wireless data communications based on said mask.

In yet another embodiment is disclosed a system for enabling wireless data communications at a communications device, the system comprising a configuration communication module adapted to send location information and capability information associated with the communications device and a data communication module adapted to send data messages from the communications device wherein the configuration communication module is further adapted to receive an enablement response in response to a data message sent and wherein the data communications module is even further adapted to selectively send another data message from the communications device based on said enablement response.

In yet another embodiment is disclosed a method for configuring wireless data communications at a communications device, the method comprising sending location information and capability information associated with the communications device in response to the location information and capability information sent, receiving configuration information and selectively configuring wireless communications at the communications device based on said configuration information.

FIG. 1 is an exemplary environment in which a wireless communication system 100 in accordance with a preferred embodiment may be practiced. The exemplary wireless communication system 100 includes a plurality of host services (three shown, 102, 104, and 106), each of which may have a plurality of services such as, but not limited to, e-mail, calendar, Internet web browser, and other applications, available to their subscribers. In this particular example, the host services 102, 104, and 106 are typically configured as servers, each containing at least one processor, a storage means and each using a network interface over which communications with a communication network 108 such as the Internet can be effectuated. The host services 102, 104 and 106 send and receive messages over communications network 108 to and from wireless router system 110 allowing communication between the host services 102, 104, and 106 and the wireless router system 110.

The wireless router system 110 is connected to a plurality of wireless networks (three shown, 114, 116, and 118), each of which may support a plurality of mobile devices (one in each wireless network is shown, 120, 122, and 124). The wireless networks 114, 116, and 118 may be a cellular telephone network, such as a global system for mobile communication (GSM) network, or a code division multiple access (CDMA) network, a two-way paging network, a short range wireless network such as Bluetooth™ and IEEE 802.11 compliant network, and others alike, and the mobile devices 120, 122, and 124 are devices compatible with the corresponding wireless network.

Mobile communications devices 120, 122 and 124 are two-way communication devices with advanced data communication capabilities having the capability to communicate with other mobile devices or computer systems, such as host services 102, 104, 106, through a network of transceiver stations, including wireless router 110 and communication network 108. The mobile communication devices 120, 122 and 124 may also have the capability to allow voice communication. Depending on the functionality provided, it may be referred to as a data messaging device, a two-way pager, a cellular telephone with data messaging capabilities, a wireless Internet appliance, or a data communication device (with or without telephony capabilities). The preceding list is not meant to be exhaustive; the embodiments described herein can be practised with any type of mobile device, whether listed above or not. In the example shown in FIG. 1, mobile communications devices 120, 122 and 124 each contain a processor, a radio, an information storage means and at least one software module adapted to perform tasks. In a preferred embodiment, mobile communications devices 120, 122 and 124 are capable of sending and receiving messages using the radio. Also in the preferred embodiment, the at least one software module includes an event generator module, adapted to generate events, and a communications module, adapted to send and receive messages using the MCD's radio.

Mobile communications devices are generally capable of communicating over multiple communication channels. For example, SMS messages arrive over the voice communication channel, whereas email messages arrive over a data communication channel. In a preferred embodiment enable messages (327 and 336) are received at MCD 120 using the same communication channel as is used by MCD 120 to receive the entire message (348 and 351). As explained above, the MCD 120 includes modules, software for example, which are adapted to perform various tasks when executed in MCD 102's processor. In one embodiment, the MCD 120 contains both a communication module and an event generator module. The communication module is adapted to execute in MCD 120's processor and in cooperation with the MCD 120's radio is capable of sending and receiving messages. The event generator module is also adapted to execute in MCD 120's processor and is capable of generating events in one of two ways: user generated events and device generated events. User generated events include such things as the user of MCD 120 opening a messaging application resident in MCD 120, such as an email application, the user of MCD 120 rolling a wheel input device, such as a thumbwheel, the user of MCD 120 pressing a key on MCD 120's keyboard, the user of MCD 120 logging in to MCD 120 or the user of MCD 120 electing to maintain an session active by responding to a prompt from MCD 120. Device generated events include such things as the expiry of a timer, MCD 120 generating a ping message to keep a session alive with the network or MCD 120 commencing a data session, such as a PDP context, with a network.

One of the primary purposes of host services 102, 104 and 106 is to process information received from other sources, such as mail servers (not shown) and mobile communications devices 120, 122, 124, and send the information on to the appropriate recipient, typically a different host service 102, 104, 106, mail server or mobile communications device 120, 122 or 124. Host services 102, 104 and 106 are configured to send and receive email messages and as such typically communicate with a mail server. Mail servers could include for example a Microsoft® Exchange® server, a Lotus® Domino® server, a Novell® GroupWise® server, an IMAP Server, a POP Server or a webmail server or any other mail server as would be understood by those in the art. The host services 102, 104 and 106 also contain a software module, which executes in their processor to achieve the desired sending and receiving of messages as well as the appropriate processing of information. In a preferred embodiment the software module of each host service 102, 104, 106 is a messaging module, the messaging module is adapted to receive messages from at least one external mail server, send messages to mobile communications devices 120, 122, 124, receive messages from the same mobile communications devices and send messages to the at least one external mail server(s). The at least one external mail server(s) could also be at least one mobile data server(s) for example. The wireless router system 110 may also be directly connected to a host service, such as a local service 112, without the communication network 108. In another embodiment, it is possible for host services 102, 104 and 106 to communicate directly with mobile communications devices 120, 122 and 124, in this embodiment, host services 102, 104 and 106 must be capable of addressing communications to mobile communications devices 120, 122 and 124 without the aid of the wireless router system 110.

In the environment described in FIG. 1, messaging occurs between mobile communications devices 120, 122 and 124 and host services 102, 104 and 106. It is possible for mobile communications devices 120, 122 and 124 to send messages to and receive messages from host services 102, 104 and 106. As an example, when a message is received by any one of host services 102, 104, 106, the intended recipient, mobile communications devices 120, 122 and 124 is informed by the host service 102, 104 and 106 that a message has arrived which needs to be retrieved by way of an enable message. Host service 102, 104 and 106 may send a plurality of enable messages to mobile communications device 120, 122 and 124 or host service 102, 104 and 106 may choose to send one enable message until mobile communications device 120, 122 and 124 fetches the pending message(s). A fetch command is issued by the mobile communications device 120, 122 and 124 upon the generation of an event by an event generator after an enable message has been received and is sent to host service 102, 104 and 106. The generated event and the enable message are independent and neither one influences the occurrence or likelihood of the other. When host service 102, 104 and 106 receives a fetch command, host services 102, 104 and 106 will send the pending message or messages to mobile communications device 120, 122 and 124 which issued the fetch command. Both the enable messages and the fetch message may or may not contain message identifiers. A message identifier uniquely identifies a message for mobile communications devices 120, 122 and 124 and allows mobile communications devices 120, 122 and 124 to retrieve specific messages. The host service 102, 104, 106 may send all pending messages should multiple messages be pending for the mobile communications device 120, 122 and 124 which issued the fetch command.

Figure 2:
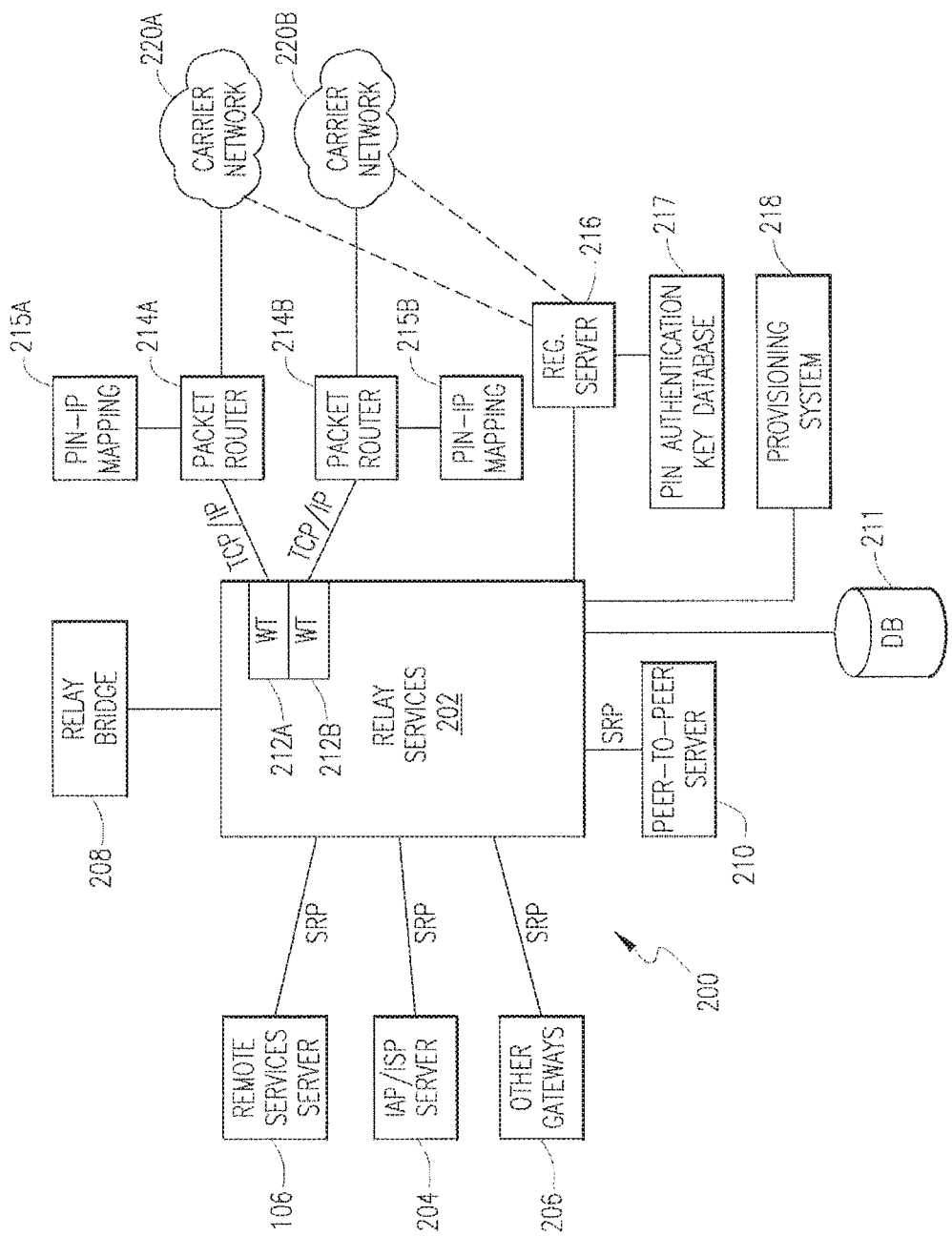
FIG. 2 depicts additional details of an exemplary relay network infrastructure operable as part of the wireless router system of FIG. 1.

FIG. 2 depicts additional details of an exemplary relay network infrastructure 200 operable as part of wireless router system 110 (from FIG. 1) described above. A relay services node 202 is operable, at least in part, for providing connectivity between mobile communication devices 120, 122, 124 and various data application services (host services 106, Internet Access Provider/Internet Service Provider server 204, peer-to-peer server 210 and other gateways 206 for example), regardless of the geographic location of the mobile communications devices 120, 122, 124 and their respective wireless carriers. Relay services node 202 comprises a communication module and an enablement module (not shown). The communication module is adapted to provide or receive information from other sources, the information comprising location and capability information sent from communications devices. The enablement module is adapted to provide or create a mask based on the information received by the communication module, the mask being used to enable or disable data communications. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which mobile communication device messages can flow to and from host services 102, 104, 106, irrespective of the region where the mobile communications device 120, 122, 124 is in.

Communication between the relay services node 202 and various application gateways and servers is effectuated using any suitable protocol, e.g., Server Relay Protocol (SRP), preferably over Internet Protocol (IP) links. By way of illustration, host service 102 (from FIG. 1) associated with the communication network 108 (from FIG. 1) sends information to and receives information from relay services node 202 using SRP. Relay services node 202 in turn sends information to and receives information from mobile communications devices 120, 122 and 124. Likewise, reference numerals 204 and 206 refer to external application gateways, such as Internet Service Provider (ISP) or Internet Access Provider (IAP) servers, and other gateways, respectively, which are also interfaced with the relay services node 202 using SRP. A peer-to-peer server 210 may also be provided in operable connection with the relay services node 202 for handling peer-level messaging between two mobile communication devices 120, 122, 124 using their respective PIN indicia.

Additionally, a database 211 may be provided in operable connection with the relay services node 202 for handling and managing mobile communication device location and capability information. Preferably, this location and capability information is stored in records by PIN indicia of the mobile communication devices 120, 122, 124, which may be programmed into the devices at the time of manufacture or dynamically assigned afterwards, wherein the stored records maintain a particular device's last known location and capabilities. A registration server 216 is operable for providing registration services for mobile communication devices 120, 122, 124 when they are initially activated or when the user re-registers due to moving to a different wireless network coverage area. In one implementation, the address information of registration server 216 may be programmed into the mobile communication devices 120, 122, 124 to locate, contact and register with registration server 216. When a mobile communications device 120, 122, 124 registers successfully, registration server 216 is operable to provide relay services node 202's location, whereupon data sessions may be engaged by the mobile communications device 120, 122, 124. Further, a database 217 is associated with the registration server 216 for storing a PIN authentication key provided by the mobile communication device during its registration with the network. The PIN authentication key may be used by the network in securing the PIN indicium of a mobile communication device 120, 122, 124 so that it can be ensured that packets are delivered to or received from a legitimate mobile communication device (i.e., with a valid PIN) instead of a device that has illegally accessed or stolen a PIN or managed to impersonate, or spoof, a PIN.

One or more wireless transport (WT) interfaces are provided as part of relay services node 202 for connecting with the wireless carrier networks that service mobile communication devices 120, 122, 124. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B.

Continuing to refer to FIG. 2, registration server 216, which handles administration and registration services for mobile communication devices 120, 122, 124, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, mobile communication device manufacturers, resellers, and other entities in order to support any number of service and market differentiation requirements. Additionally, the provisioning system 218 may include logic for provisioning personalized indicia (e.g., PIN assignment and management) with respect to the mobile communication devices 120, 122, 124. Also, subscriber validation logic may be provided as part of the provisioning system 218. PRV 218 and relay services node 202 may additionally include logic and storage means intended to track the current state of individual or groups of mobile communication devices 120, 122, 124 as well as the current state of individual or groups of host services 102, 104 and 106. The current state information to be stored, preferably in a cache or database 211, may include such information as location, capabilities and mask values. In a preferred embodiment, mobile communications devices 120, 122 and 124 report their location and capabilities to registration server 216 which passes the information on the relay services node 202. Also in a preferred embodiment, host services 102, 104 and 106 report their location and capabilities directly to relay services node 202. In a preferred embodiment, mask values (masks) are determined by relay services node based on the received location and capabilities data. These masks are stored in association with an identification of the originator of the information and are used to determine the originator's accessibility to certain services, including but not limited to email service and any other data service. Using the masks, relay services 202 can decide, for example, whether to pass on a data communication received from a given mobile communications device 120, 122, 124 or drop the communication and send a negative acknowledgment to the sender. Alternatively, the masks, or a portion of the masks, could be sent to mobile communications device 120, 122, 124 or to host service 102, 104, 106 so that mobile communications device 120, 122, 124 or to host service 102, 104, 106 can filter their own data communications before sending data communications to relay services 202. Current state information, such as location, capabilities and masks, can be updated through communication with registration server 216, communication with a mobile communication device 120, 122, 124 or communication with host services 102, 104, 106. In another embodiment, the current state information could be stored at WT 212A and 212B.

Figure 3:
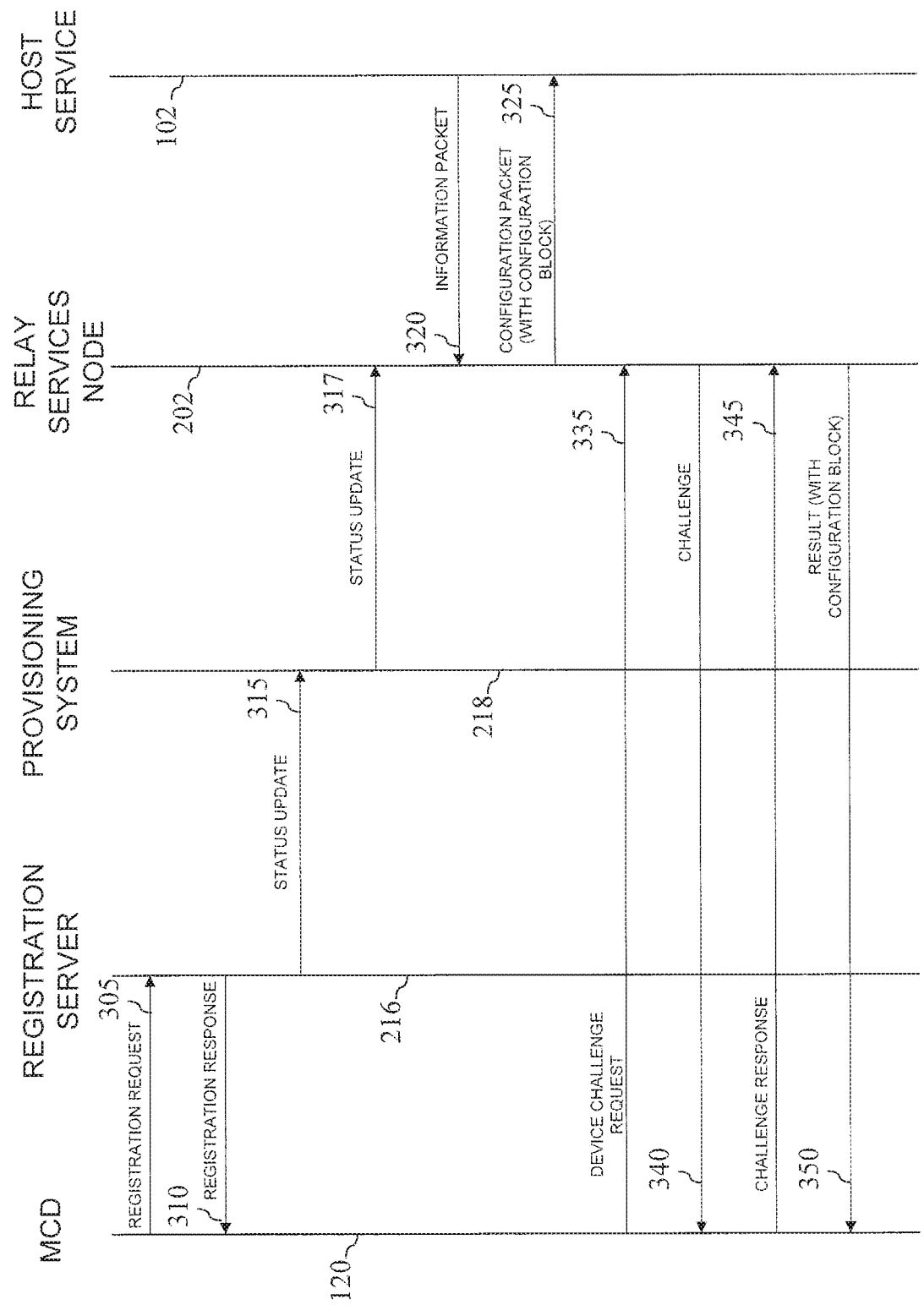
FIG. 3 is a communications sequence diagram describing an exemplary system and method for wireless messaging between a host service and a mobile communications device of FIG. 1.

Reference is now made to FIG. 3, where there is shown an exemplary embodiment of how a configuration communication session between mobile communications device (MCD) 120, 122, 124, host services 102, 104, 106, relay services node 202, provisioning server 218 and registration server 216 may be carried out to properly configure communications between MCD 120, 122, 124, relay services node 202 and host services 102, 104, 106. Before describing the message flow shown in FIG. 3, a detailed description of the participants and the individual messages themselves is first provided below.

Labelled participants in this flow diagram are: the mobile communications device (MCD) 120 (which could also be any of wireless communications devices 122 and 124), relay services node 202 and host services 102 (which could also be any of host services 104 and 106), provisioning server 218 and registration server 216. In this particular example, mobile communications device 102 and host services 120 disclose location and capability information to relay services 202. This disclosure enables relay services 202 to decide whether or not it will allow certain types of data communications, email for example, to pass through relay services 202 when destined to or originated from mobile communications device 102 and host services 202.

To initiate proper configuration of MCD 120, communication 305 is sent to register mobile communications device 120 with registration server 216. Communication 305 contains registration information and is sent from mobile communications device 120 to registration server 216 containing such information as device location and capability information. Device location information as contained in communication 305 is an indicator of the geographic location wherein mobile communications device 120 is currently located. The device location information which can be, for example, an IP address or network provider code is discussed in further detail below. Device capability information as contained in communication 305 could be any indicator of mobile communications device 120's ability to support or comply with features or protocols and for example may include a number to indicate at which level mobile communications device 120 is compliant to a specified protocol (protocol support information) or a listing of which features mobile communications device 120 does support or is capable of supporting (feature compliance information).

In communication 310, registration server 216 replies to communication 305 with a registration response. This registration response includes such information as resource access addresses, associated lists of network access addresses and capability fields associated with each network access address. The capability fields associated with each network access address include such information as whether or not MCD 120 should expect to operate in a given mode when communicating with the resource specified by the resource access address when using the network specified by the network access address. Registration server 216 also provides communication 315 to provisioning system 218 which passes on the relevant information, including location and capabilities, received from mobile communications device 120 in communication 305. This information is stored at provisioning system 218 and can be used to determine future behaviour and communications between the provisioning system 218 and MCD 120. This information is also passed to relay services 202 as communication 317. Relay services 202 stores this information in a database or in a cache for example, and utilizes this information to, for example, determine whether mobile communications device 120 is allowed access to certain services, such as email or web browsing for example.

In a preferred embodiment, relay services 202 uses the device location and capability information received in communication 317 to create and store a mask associated with mobile communications device 120. This mask is used, at least in part, to determine whether subsequent data messages received from and/or destined to mobile communications device 120 are allowable. For example, if a data message received from MCD 120 is allowable, relay services 202 sends the message on to the intended recipient. If the data message is not allowable, relay services 202 considers whether mobile communications device 120 has been provided with enough warnings, or time, to stop sending subsequent data messages by further examining the mask for an indication that a warning is required or by examining a warnings monitor. If relay services 202 determines that mobile communications device 120 has been provided with enough warnings, or time, to cease sending subsequent data messages, relay services 202 drops subsequent data messages and send a negative acknowledgment to mobile communications device 120. If, prior to sending an allowable data message, relay services 202 determines that mobile communications device 120 has not been give sufficient warning, or time, relay services 202 sends the data message on to the intended recipient, sends a warning to mobile communications device 120, updates a warnings, or time, monitor and mobile communications device 120 provides a notification to the user of mobile communications device 120 that they are or will be in the future restricted from sending any subsequent data messages. Mobile communications device 120, upon receipt of the warning, optionally restricts the user from further attempts to send data messages. The warnings monitor can be any value stored in a data store and associated with mobile communications device 120. The warnings monitor is, for example, a date, after which mobile communications device 120 will no longer be allowed to send data messages. The warnings monitor is, as another example, a counter whose value is incremented or decremented and checked to ensure that mobile communications device 120 hasn't sent more than a maximum number of allowable data messages, after the maximum value has been exceeded, mobile communications device 120 will be disallowed from sending data messages. The relay services node 202 sends an enablement response to MCD 120 or host service 102 in response to a data message received from the one of MCD 120 or host service 102 and the enablement response could be one of a positive acknowledgment, a negative acknowledgment, a warning message or the associated mask. The enablement response allows the one of MCD 120 or host services 102 to configure future data communications, including disabling future data communication, or simply allows MCD 120 or host service 102 to be aware of the result of the sent data message.

To initiate proper configuration of host service 102, communication 320 is sent from host services 102 and passes information to relay services 202. The information contained in communication 320 includes host service location and capability information. Relay services 202 stores and uses this information as a mask, in a database or a cache for example. Relay services 202 uses, at least in part, the stored mask to determine if future communications received from, or destined to, host services 102 will be allowed to pass, or will be negatively acknowledged (possibly with a warning) and possibly dropped.

Communication 325 is sent from relay services 202 in response to communication 320 and supplies a configuration block to host services 102. This configuration block will be discussed in detail below, and includes information for how host services 102 is to operate. Upon receipt of communication 325, host services 102 will alter its operation to conform with the parameters and fields included in the configuration block received in communication 325.

Communication 335 initiates a challenge-response conversation between mobile communications device 120 and relay services 202 which establishes security parameters and shares configuration information for use by both MCD 120 and relay services 202. The security parameters and shared configuration information will be used by both MCD 120 and relay service 202 to ensure that subsequent communications are secure and proper. The challenge-response conversation differs from the conversation comprising registration request 305 and registration response 310 because the challenge-response conversation serves to establish security parameters. There can exist some overlap between information exchanged during communications 305 and 310 and the challenge-response conversation. Communication 340 indicates that relay services 202 has received communication 335 and wishes to continue the challenge-response conversation. As a response to communication 335, mobile communications device 120 issues communication 345. Communication 345 shares a key used to secure further communications between MCD 120 and relay services node 202, as well as to communicate MCD 120's capabilities to relay services 202. The shared key is a subset of the data which is included in communication 345 and is stored by both mobile communications device 120 and relay services 202 and is used as a key for scrambling or encrypting subsequent communications between mobile communications device 120 and relay services 202. The device capabilities included in communication 345, include the level of support at which mobile communications device 120 is capable of cooperating with established protocols and methods and are stored by relay services 202 for future use. In communication 350, relay services 202 will respond to communication 345 with a result. The result will include a configuration block which is specific to MCD 120 and is to be used by MCD 120 to alter its mode of operation if required. This configuration block will be discussed below, and includes information for how mobile communications device 102 is to behave.

As a result of communications 305, 320 and 345, provisioning system 218 and relay services 202 have an accurate assessment of the state and status of both mobile communications device 120 and host services 120. Based on the information exchanged during the conversation described by FIG. 3, relay services 202 possesses stored masks which allow relay service 202 to decide how to treat subsequent data messages which are received from, or destined to, either mobile communications device 120 or host services 102. The above described conversation is meant only as an exemplary embodiment. Those in the art can appreciate different configurations and orderings of this conversation. For example, it is not necessary for 305 and 320 to occur in the order presented in FIG. 3. Any ordering or a different number of these communications would be possible and are considered to be alternate embodiments.

The masks obtained and stored by relay services 202 during the conversation described in FIG. 3 enables relay services 202 to determine whether mobile communications device 120 or host service 102 is enabled or disabled from sending and receiving certain types of communications. In one embodiment, if the mask which relay services 202 has stored and associated with mobile communications device 120 indicates that mobile communications device 120 does not support a certain protocol at a high enough level, or is in an inappropriate location for a particular service provided by host service 102, email or other data communications are blocked, effectively cutting mobile communications device 120 off from host service 102 for these types of communications. In another embodiment, if the mask which relay services 202 has stored and associated with host service 102 indicates that host services 102 is located in an inappropriate location or that it does not support a required protocol at a required level, relay services 202 no longer sends email or other data communications to host service 102 and relay services 202 ceases forwarding email or other data communications received from host service 102. In yet another embodiment, relay services node 202 has the ability to associate a specific MCD 120 with a specific host service 102 and relay services node 202 uses one or both of the masks stored and associated with MCD 120 and host service 102 respectively to determine whether or not data communications will be allowed to or from either MCD 120 or host service 102. In a preferred embodiment, relay services 202 intercepts disallowed data communications and replies to the sender with a negative acknowledgment (or a warning) without sending the data communication to the intended recipient. In another embodiment, mobile communications device 120 and host services 102 are informed by relay services 202 in a separate communication that they are not allowed to send certain types of data communications through relay services 202, and mobile communications device 120 and host services 102 would no longer send those types of communications.

In the above description of FIG. 3, reference has been made to location information in communication 305 and in communication 320. Location information in these two communications is determined based on properties of the communication in which the location information is contained, such as the communication's source IP address, or based on properties contained in the message itself, such as the identifier of the carrier network on which MCD 120 is operating or the network provider code supplied by MCD 120. With this information, it is possible for registration server 216, provisioning system 218 and relay services 202 to accurately determine where the message's originator is geographically located. A network provider code (NPC) can be a combination of certain network related information which is used to aid in determining the location of mobile communications device 120. For example, if mobile communications device 120 is operable in a GSM network, the NPC is composed of the Mobile Country Code (MCC), the Mobile Network Code (MNC) and an indicator of network type, if mobile communications device 120 is operable in a CDMA network, the NPC is composed of the SID and a network type indicator. The resolution of location is, for example, the result of looking up MCD 120's or host services 102's IP address in an IP address-to-country mapping stored in a storage means, such as a lookup table or database for example, or the result of looking up MCD 120's NPC in a carrier-to-location mapping in a storage means, such as a lookup table or a database for example. The granularity of the location includes, but is not limited to, the country in which either mobile communications device 120 or host services 102 is located.

The configuration block which is communicated during communications 325 contains fields which host services 102 uses to determine its own behavior and can for example contain the following fields:

Assume Capability Level:

Instructs the host services 102 to assume that mobile communications device 120 supports a particular capability level, until otherwise determined.

Default Message Type:

Determines the default message type that host services 102 should send to mobile communications device 120 until mobile communications device 120 instructs the host services 102 to send a different type. Values could indicate: send regular email; send one enabling packet for each new email message destined for the mobile communications device 120; send one enabling packet for all pending email messages for the mobile communications device 120 and once the mobile communications device 120 has polled to fetch this email, the host services 102 may send another notification; or send no email to the mobile communications device 120.

Batched Enabling Packet Format:

Determines the message headers that the host services 102 may put in an enabling packet sent to a mobile communications device 120 when it must send one enabling packet for all pending email. Values could indicate: the host services 102 may include the Sender (From) header; the host services 102 may include the Recipient (To) header; the host services 102 may include the Subject header; the host services 102 may include the Subject header, but must truncate it to 20 characters; or the host services 102 may include the Message Reference ID; the host services 102 may include the message Body.

Separate Enabling Packet Format:

Determines the message headers that the host services 102 may put in an enabling packet sent to the mobile communications device 120 when it may send one enabling packet for each new email message. Values could indicate: the host services 102 may include the Sender (From) header; the host services 102 may include the Recipient (To) header; the host services 102 may include the Subject header; the host services 102 may include the Subject header, but must truncate it to 20 characters; the host services 102 may include the Message Reference ID; or the host services 102 may include the message Body.

Send No Email to Non-Capable Mobile Device:

Determines if the host services 102 may send email or enabling packets to non-capable mobile communications devices 120. Values could indicate: host services 102 may send email (or enabling packets) to mobile communications device 120 that it knows do not support a particular protocol or feature; or host services 102 may not send email (or enabling packets) to mobile communications device 120 that it knows do not support a particular protocol or feature.

The configuration block which is communicated during communications 350 is used by mobile communications device 120 to determine behaviour and could for example contain the following fields:

PIN Removal:

Determines if the mobile communications device 120 must remove the PIN from all message sent to the mobile communications device.

Conditional Poll Interval:

Specifies the length of time between conditional polls performed by the mobile communications device 120.

Unconditional Poll Interval:

Specifies the length of time between unconditional polls performed by the mobile communications device 120.

Login/Logout Required:

Determines if the mobile communications device 120 user must manually control sessions with the host services 102 (login and logout).

Maximum Session Idle Time:

Specifies the number of minutes before an idle mobile communications device 120 logs out.

Display Enables in Message List:

Determines if the mobile communications device 120 puts placeholder messages in the message list for the enabling packets it receives.

Report Session Status:

Determines if the mobile communications device 120 must periodically report its session status to the host services 102.

Action-Initiated Poll Allowed:

Determines if the mobile communications device 120 may poll the host services 102 when the mobile communications device 120 performs a particular action (for example, turning on the radio, removing the mobile communications device 120 from its holster).

Manual Poll Allowed:

Determines if the mobile communications device 120 user may manually poll the host services 102 for new email.

P2P Subject Removal:

Determines if the mobile communications device 120 must remove the Subject header from all P2P traffic.

Extended Session Allowed:

Determines if the mobile communications device 120 can offer extended sessions to the mobile communications device 120 user.

Modify Conditional Poll Interval Allowed:

Determines if the mobile communications device 120 user is allowed to modify the conditional poll interval (whether the mobile communications device 120 must provide a user interface option to facilitate this).

Polling Required:

Determines if the mobile communications device 120 must poll the host services 102 for new email.

Logged in Message Type Expected:

Specifies the message type the mobile communications device 120 should expect to receive from the host services 102 when it is operating in the United States and has an open session (logged in). Values could indicate: mobile communications device 120 should receive regular email; mobile communications device 120 should receive one enabling packet for each email message it has pending at the host services 102; mobile communications device 120 should receive one enabling packet when it has pending email at the host services 102; or mobile communications device 120 should receive no email from host services 102.

Logged Out Message Type Expected:

Specifies the message type the mobile communications device 120 should expect to receive from the host services 102 when it is operating in the United States but does not have an open session (logged out). Values could indicate: mobile communications device 120 should receive regular email; mobile communications device 120 should receive one enabling packet for each email message it has pending at the host services 102; mobile communications device 120 should receive one enabling packet when it has pending email at the host services 102; or mobile communications device 120 should receive no email from host services 102.

One skilled in the art should appreciate that the various databases and service logic processing set forth above with respect to the wireless communications system may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

What is claimed is:

1. A method of operating a mobile device comprising:
   receiving an enable message indicating that a pending data message is available for retrieval from a host service; and
   communicating directly with the host service to retrieve the pending data message from the host service after receiving the enable message and opening an application at the mobile device.

2. The method of claim 1, wherein communicating directly with the host service comprises:
   sending a fetch message directly to the host service to retrieve the pending data message from the host service; and
   receiving the pending data message directly from the host service after sending the fetch message to the host service.

3. The method of claim 1, wherein the application comprises an electronic mail application, wherein the method further comprises opening the electronic mail application at the mobile device subsequent to receiving the enable message.

4. The method of claim 1, wherein the pending data message is an electronic mail message comprising a body of text.

5. The method of claim 1, wherein the enable message is received from a relay services node.

6. The method of claim 1, wherein the enable message comprises an identifier that identifies the pending data message.

7. The method of claim 1, wherein communicating directly with the host service comprises retrieving a plurality of pending data messages from the host service after receiving the enable message.

8. A mobile device comprising:
   a transceiver configured to receive an enable message indicating that a pending data message is available for retrieval from a host service; and
   a processor coupled to the receiver and configured to communicate directly with the host service to retrieve the pending data message from the host service after opening an application at the mobile device.

9. The mobile device of claim 8, wherein the application comprises a messaging application, and wherein the processor is further configured to open the messaging application subsequent to receiving the enable message and prior to communicating directly with the host service.

10. The mobile device of claim 8, wherein the transceiver is further configured to receive the pending data message after the enable message is received.

11. The mobile device of claim 8, wherein the transceiver is further configured to:
    send a fetch message to the host service to retrieve the pending data message from the host service; and
    receive the pending data message from the host service after sending the fetch message to the host service.

12. The mobile device of claim 8, wherein the transceiver is further configured to send a data message after receiving the pending data message.

13. The mobile device of claim 8, wherein the enable message comprises an identifier that identifies the pending data message.

14. A non-transitory computer readable medium storing instructions that enable communication with a mobile device via a wireless network, wherein the instructions that enable communication with the mobile device via the wireless network comprise:
    sending an enable message to the mobile device, wherein the enable message identifies a pending data message at a host service; and
    communicating directly with the mobile device to retrieve the pending data message from the host service after sending the enable message and opening an application at the mobile device.

15. The non-transitory computer readable medium of claim 14, wherein the instructions that enable communication with the mobile device via the wireless network further comprise:
    retrieving the pending data message subsequent to sending the enable message to the mobile device; and
    transmitting the pending data message to the mobile device.

16. The non-transitory computer readable medium of claim 14, wherein the instructions that enable communication with the mobile device via the wireless network further comprise:
    receiving the pending data message before sending the enable message; and
    storing the pending data message before sending the enable message.

17. The non-transitory computer readable medium of claim 14, wherein the instructions that enable communication with the mobile device via the wireless network further comprise opening a data session with the mobile device after sending the enable message.

18. The non-transitory computer readable medium of claim 17, wherein the instructions that enable communication with the mobile device via the wireless network further comprise using the data session to transmit the pending data message to the mobile device.

19. The non-transitory computer readable medium of claim 14, wherein the enable message comprises an identifier that identifies the pending data message.

20. The non-transitory computer readable medium of claim 14, wherein the instructions that enable communication with the mobile device via the wireless network further comprise receiving a fetch message from the mobile device for the pending data message, and wherein the pending data message is retrieved after receiving the fetch message.

* * * * *